Nov. 6, 1956
E. C. BALLMAN
2,769,933
STATOR CONSTRUCTION
Filed Sept. 4, 1953
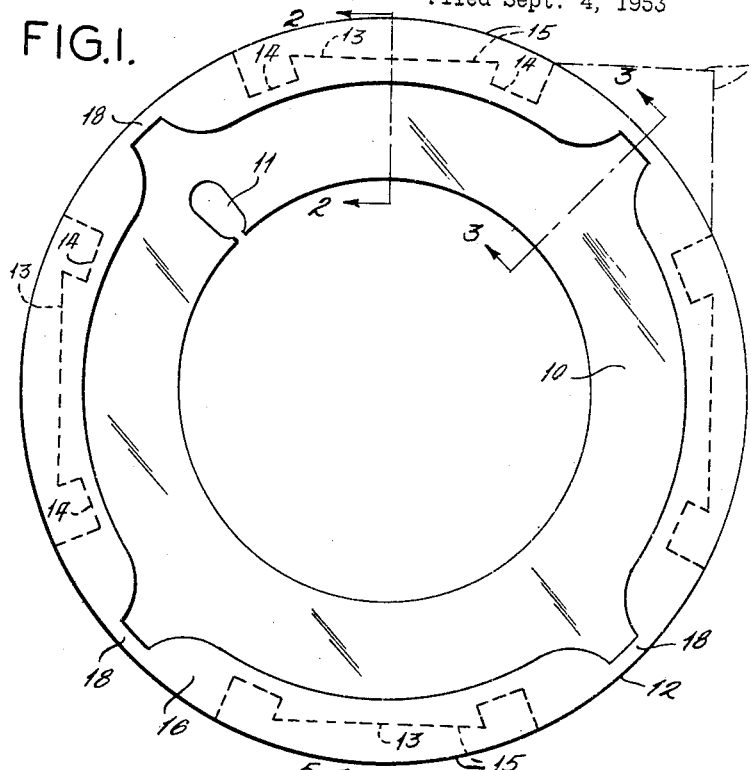
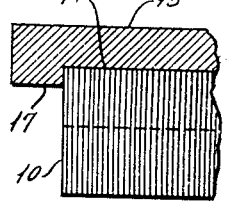
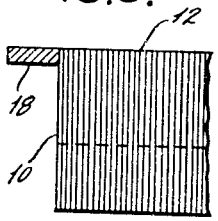
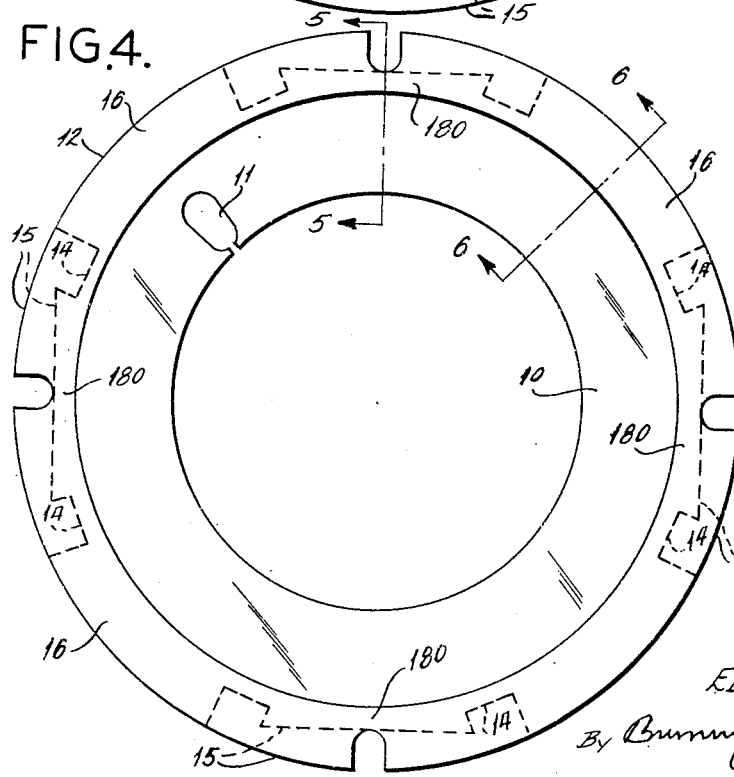
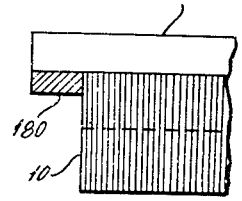
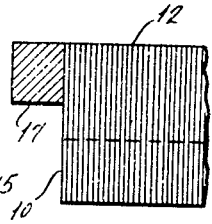
INVENTOR:
EDWIN C. BALLMAN
By Bunninga & Sutherland
ATTORNEYS.

United States Patent Office 2,769,933
Patented Nov. 6, 1956

2,769,933
STATOR CONSTRUCTION

Edwin C. Ballman, St. Louis, Mo., assignor to Ballman Engineering Company, St. Louis, Mo., a corporation of Missouri Application September 4, 1953, Serial No. 378,543

4 Claims. (Cl. 310—217)

This invention relates to stator structures for dynamo electric machines, which structures have laminated ferrous cores. This invention is particularly applicable to stators for electric alternating current motors.

In the construction of laminated stator cores of this type, difficulty has been experienced heretofore in securing the stacked assembly of laminae in such a manner as to render the finished structure rigid. The laminae must be pressed together sufficiently to make a substantially solid core and their tendency to slip on each other must be overcome.

In electric motor construction it is desirable that the stationary magnetic core be also the frame of the motor so as to reduce weight, size and cost without sacrificing the cooling of the motor. The stack of laminations of a stator is not a very rigid mass, as it is spongy at right angles to the laminations and the individual lamination can easily shift in any direction in a plane parallel to the laminations. Merely compressing the laminations together does not give enough friction to make a rigid structure. Due to this spongy characteristic of a stack of laminations, the following is necessary: In order to make a successful stator, it is necessary that the laminations be clamped together tightly stackwise almost completely around its outer periphery and also the individual laminations must be rigidly prevented from shifting over each other in any direction.

In the electric motor it is necessary that the magnetic core be circular in shape in order to provide the proper magnetic flux. This magnetic core is built up ordinarily of circular sheets of steel. The raw steel sheets are square in shape so in cutting the circular sheet about 28% of the sheet steel is scrap. This scrap is in the four corners of the square and by utilizing some of this material to produce part of the stator frame structure there is a saving in cost.

One of the objects of this invention; therefore, is to provide a simple construction which will both make a rigid stator core and entail a low manufacturing cost.

Another object is to provide such a construction and an improved mode for carrying it out whereby the shrinkage pressure of cast metal may be applied to hold the stack of laminae rigidly in assembled relation.

Further objects will appear from the following description in which will be set forth an illustrative embodiment of this invention. It is to be understood, however, that this invention is susceptible of various embodiments, without in the scope of the appended claims, without departing from the principles or spirit of the invention.

In the accompanying drawing:

Figure 1 is a face view of a core embodying this invention;

Figure 2 is a section on line 2—2 of Figure 1;
Figure 3 is a section on line 3—3 of Figure 1;
Figure 4 is a view similar to Figure 1, but illustrating another embodiment of this invention;
Figure 5 is a section along the line 5—5 of Figure 4; and Figure 6 is a section along the line 6—6 of Figure 4.

Referring to the accompanying drawing, more particularly to Figures 1–3, 10 designates the laminated substantially cylindrical core having slots for receiving the winding, one of such slots being shown at 11. In the embodiments described, the laminations are punched from square sheets and the corners, one of which is shown at 20, are cut off to the cylindrical outline of the core. That leaves outside flat edges 13 spaced 90° about the core and outside circular edges 12 also spaced 90° about the core. The laminations are also punched to provide a series of slots circumferentially spaced about 45° and extending radially inwardly to provide generally radial side walls constituting the side walls of dovetailed anchors. The dovetails are thus truncated by the flat edges 13 to provide a space to accommodate a cylindrical segment 15 of cast material connected by a pair of those slots as hereinafter described. The normal magnetic circuit of the core will be within the bottoms of the slots 14.

A series of members in the form of segments 15 of non-ferrous metal, such as aluminum, magnesium, zinc or their alloys, are arranged circumferentially around the core, there being, in this case, four of such segments. Each of these segments is provided with inwardly extending lugs conforming to the recesses 14 and also conforming to flat parts 13 of the core. A series of lateral members 16 extend circumferentially of the core, one on each side of the core and opposite the segments 15. They take against the ends of the core as shown at 17, Figure 2. These members 16, however, bridge the gaps between the segments 15. These members 16 connect with lugs in the recesses 14 by being cast integral with those lugs and the segments 15, and when the non-ferrous parts 15 and 16 are cast on the core, the segments 15 will become anchored in the slots 14 and on the flat edges 13. At spaced points around the periphery and between the segments 15, the cross-section of the members 16 are notched so as to reduce their cross section as shown at 18, Figs. 1 and 3, so as to weaken the members 16 at those points. While, therefore, the members 16 extend entirely around the core, the segments 15 do not extend therearound.

In Figures 4, 5 and 6, similar parts are indicated by like reference characters as in Figures 1–3. The members 16, while connected with the lugs in the recesses 14, are weakened at their outside circumference by notching at spaced points as shown at 180. Again the members 16 are cast integral with the lugs in the recesses 14 and with the segments 15 so as to become anchored in the recesses 14 and on the flat parts 13.

In manufacturing, the laminations are clamped together in any suitable manner, and then placed in a mold provided with mold recesses to form the segments 15, the lateral members side members 16 and the reduced or weakened parts 18 or 180. Such molds are, of course, provided with a gate and a riser. The mold may be of the usual permanent type constructed of iron or steel. As the non-ferrous metal solidifies and cools and shrinks faster than the ferrous core, the core will be firmly clamped between the side members 16. The non-ferrous alloy of the lugs shrinking circumferentially will also cause these lugs in the recesses 14 to firmly hug the insides of these recesses circumferentially so as to firmly anchor the several laminations. The laminations are held by a segment which subtends about 45° on the outer periphery of the stator laminations; accordingly, the stack of laminations cannot shift in a direction parallel to the segment. By providing two or more segments spaced about 90° from each other, the laminations are additionally held against shifting. By this construction, therefore, the laminations are firmly anchored against shifting, while torsional twisting of the stack of laminations is opposed by the segments in the same way. By casting the segments in the construction shown, the stator laminations are compressed all around and rigidly kept from shifting, resulting in a stator structure that also forms the frame of the electric motor.

The shrinking of the non-ferrous alloy axially of the core, while firmly pressing the laminations together will not place them under undue strain. Furthermore, the shrinking of the lugs in the recesses 14 towards each other will not distort the core structure. While the members 16 extend entirely around the core, the parts 18 or 180 of small cross-section will stretch or elongate upon shrinking, so that no undue strain is placed upon the core. Even if those parts 18 or 180 should break upon shrinking, no harm will be done because these side members 16 are interconnected with the lugs in the recesses 14. Furthermore, there will be no loss by eddy-currents, because the cross-sections of parts 18 or 180 is small and these are outside of the normal magnetic circuit of the core. Since both constructions have a relatively large proportion of non-ferrous metal, which is a good conductor, the heat from the stator is readily conducted to the surface of the frame. It is possible to use any number of segments; using less than four segments simply reduces the rigidity; however, the greater number of segments will prevent warping the bore out of round.

Having thus described the invention what is claimed and desired to be secured by Letters Patent is:

1. A substantially cylindrical core having a series of axially extending slots circumferentially spaced about 45° and with generally radial side walls constituting the side walls of dovetail anchors, the alternate dovetails being truncated to provide a space to accommodate a cylindrical segment of cast material connected by a pair of slots.

2. A substantially cylindrical core having a series of axially extending slots circumferentially spaced about 45° and with generally radial side walls constituting the side walls of dovetail anchors, the alternate dovetails being truncated to provide a space to accommodate a cylindrical segment of cast material connected by a pair of slots, and lateral members engaging the ends of the core and cast integral with said segments.

3. A substantially cylindrical core having a series of axially extending slots circumferentially spaced about 45° and with generally radial side walls constituting the side walls of dovetail anchors, the alternate dovetails being truncated to provide a space to accommodate a cylindrical segment of cast material connected by a pair of slots, and lateral members engaging the ends of the core and cast integral with said segments, said lateral members being notched at one or more points therealong.

4. In a substantially cylindrical core, a core lamination produced from a square sheet whose corners are cut off to the cylinder outline of the core, the flat side of the lamination having a pair of slots spaced about 45° and with generally radial side walls constituting the side walls of dovetail anchors, the alternate dovetails being truncated by the flat side to provide a space to accommodate a cylindrical segment of cast material connected by a pair of slots.

References Cited in the file of this patent

UNITED STATES PATENTS

| 2,488,458 | Walton et al. | Nov. 15, 1949 |
| 2,711,492 | Ballman | June 21, 1955 |

FOREIGN PATENTS

| 372,726 | Great Britain | Feb. 1, 1932 |
| 650,140 | Germany | Sept. 11, 1937 |
| 671,271 | Germany | Feb. 3, 1939 |